F. C. POLING.
FASTENING.
APPLICATION FILED FEB. 20, 1917.
1,231,191.
Patented June 26, 1917.
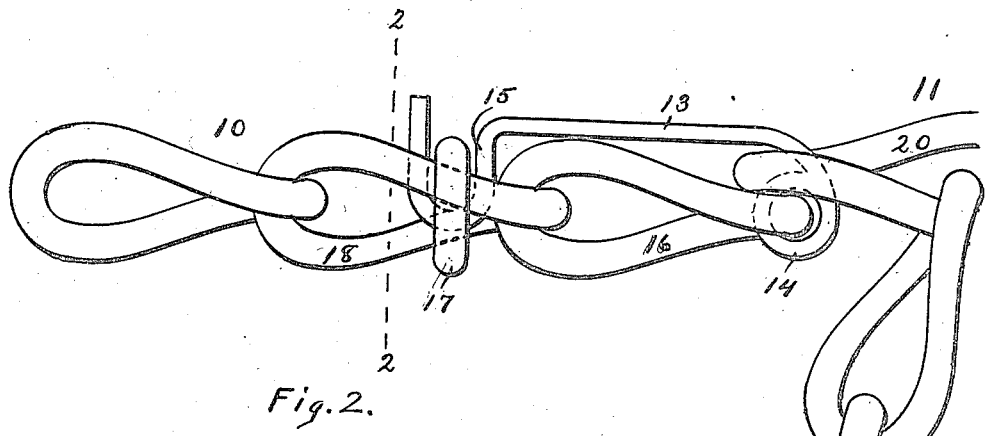
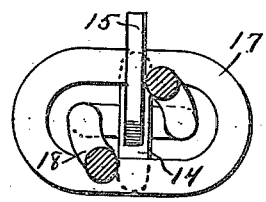
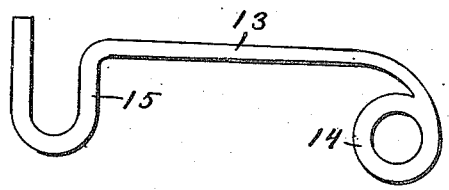
INVENTOR:
F.C.POLING
By Earl M. Sinclair
Atty.

UNITED STATES PATENT OFFICE.

FRED C. POLING, OF MENLO, IOWA, ASSIGNOR TO GOODE ANTI-SKID CHAIN MANUFACTURING COMPANY, OF DES MOINES, IOWA, A CORPORATION OF ARIZONA.

FASTENING.

1,231,191.

Specification of Letters Patent. Patented June 26, 1917.

Application filed February 20, 1917. Serial No. 149,816.

*To all whom it may concern:*

Be it known that I, FRED C. POLING, citizen of the United States of America, and resident of Menlo, Guthrie county, Iowa, have invented a new and useful Fastening, of which the following is a specification.

The object of this invention is to provide improved means for fastening together ends, or an end and the bight, of a chain.

A further object of this invention is to provide improved means for connecting in endless form the side chains ordinarily employed in anti-skidding devices on automobile tires.

A further object of this invention is to provide an improved construction for a pivoted hasp and loop fastening especially adapted for use on side chains for automobile wheels.

My invention consists in the construction, arrangement and combination of elements hereinafter set forth, pointed out in my claims and illustrated by the accompanying drawing, in which—

Figure 1 is a side elevation showing portions of a chain and my improved fastening applied thereto. Fig. 2 is a cross-section on the indicated line 2—2 of Fig. 1. Fig. 3 is a side elevation of a hasp employed in the device.

In the construction of the device as shown the numeral 10 designates generally one end portion and 11 the opposite end portion of a side chain adapted to be employed in an anti-skidding device for automobile tires, and the numeral 12 designates generally a supplemental end portion or extension on the portion 11 of the chain adapted to be employed as a stay chain or tie chain, these features being shown and described in my application for patent filed February 13, 1917, Serial Number 148,305, to which reference herein is made.

The chain may be of varying lengths and may be variously and selectively used on tires of different circumference and on account thereof provision should be made for a fastening device susceptible of variable adjustment and selective use. Such device is shown and described herein and comprises a hasp or hook 13 relatively straight in its body portion and having an eye 14 at and offset from the longitudinal plane of one end portion. A hook 15 is formed on the opposite end portion of the hasp and preferably is offset from the longitudinal plane thereof into the plane occupied by the eye 14, while the extremity or point of the hook preferably extends across and at right angles to the longitudinal plane of the body. The hasp 13 is adapted to be mounted by pivotal engagement of the eye 14 with one end portion of a link 16 of the end portion 10 of the chain and said hasp is adapted to be moved through an arc compassing one hundred eighty degrees on one side of the trend of the chain. A closed loop 17 is mounted transversely of and loosely on and wholly embraces a link 18 of the portion 10 of the chain adjacent to and preferably interengaging with the link 16. The loop 17 may be moved longitudinally of the link 18 to any desired degree and lies wholly outside of and free from said link. The hasp 13 is adapted to be extended through a link 20 of the portion 11 of the chain and receives and pivotally connects with one end portion of said link, said end portion of the link being received and lying between one end of the body of the hasp and the end portion of the link 16 on which the hasp is pivoted. After the hasp 13 has been passed through the link 20 it is adapted to be closed upon the link 16 and compass the length thereof so that the closed portion of the hook 15 extends within the link 18. Thereupon the loop 17 is adjusted longitudinally of the link 18 over the point of the hook 15 and is received within said hook. The point of the hook 15 is of such length that the loop 17 may not by agitation, violent motion or otherwise accidentally become detached from the hasp or hook. The link 20 may be selected by the operator or user at any point in the bight of the chain, dependent upon the length of the chain and the circumference of the tire or other embracing compass with which it is used.

I claim as my invention—

1. A fastening device for chains, comprising a hasp formed with a hook at one end and also having an eye at the other end adapted to be pivoted on a link of said chain, said hook extending across the plane of the eye in one direction and across the plane of the body of the hasp in the other direction and being adapted to enter an adjacent link of said chain, together with a loop slidingly mounted on and wholly embracing said adjacent link and adapted to embrace said hook.

2. A fastening, comprising a hasp formed with a relatively straight body, and also formed with an eye offset at one end portion of said body, and also formed with a hook offset at the opposite end portion of said body into the plane of the eye, said hasp being adapted to be pivoted on a link of a chain, the hook being adapted to enter an adjacent link of the chain, a loop being mounted loosely on said adjacent link and adapted wholly to embrace said hook, said hasp being adapted to receive an oppositely adjacent link in embracing relation with its end portion adjacent to said eye, the latter link overlapping the hasp-carrying link.

Signed by me at Des Moines, Iowa, this seventeenth day of February, 1917.

FRED C. POLING.